March 27, 1945. M. NEWMAN 2,372,600

DISTRIBUTION SYSTEM REGULATOR

Filed Jan. 21, 1943

INVENTOR
MORRIS NEWMAN
By Paul, Paul & Moore
ATTORNEYS

Patented Mar. 27, 1945

2,372,600

UNITED STATES PATENT OFFICE 2,372,600

DISTRIBUTION SYSTEM REGULATOR

Morris Newman, Minneapolis, Minn., assignor to Regents of the University of Minnesota, Minneapolis, Minn., a corporation of Minnesota Application January 21, 1943, Serial No. 473,077

6 Claims. (Cl. 172—246)

The present invention relates to voltage regulator sytsems and apparatus particularly adapted for use in distribution systems having inherently high capacitative reactance. Two examples of systems having such inherently high capacitative reactance are rural electrification systems having a number of branches fed through a single feeder, and urban distribution systems wherein capacitance is added in units throughout the system to compensate for the inductive reactance component of the line and load. In such systems there is a tendency of the voltage to rise when a line is unloaded or lightly loaded. This has led to voltage failures of transformers, insulators, and equipment fed by the line and to an undesirable increase in magnetizing current for the transformers fed by the line.

It is an object of the present invention to overcome the above enumerated difficulties and to provide a distribution system in which relatively close voltage regulation is maintained throughout the system whether or not the line is loaded or unloaded.

It is also an object of the invention to provide an inherently high capacitative reactance distribution system capable of maintaining a desired close voltage regulation throughout the line under light load as well as heavy load conditions.

More specifically, it is an object of the invention to provide a distribution system of the inherently high capacitative type having voltage regulator apparatus at spaced intervals throughout the system for regulating the voltage of the system.

It is a further object of the invention to provide voltage regulator apparatus of compact and economical low voltage construction suitable for mounting at or adjacent to distribution transformers of an inherently high capacitative distribution system, and to provide a compact unitary arrangement, including complete regulating apparatus and safety and protective features for pole-line or man-hole mounting.

Other and further objects of the invention are those inherent and applied by the apparatus illustrated, described and claimed.

Figure 3:
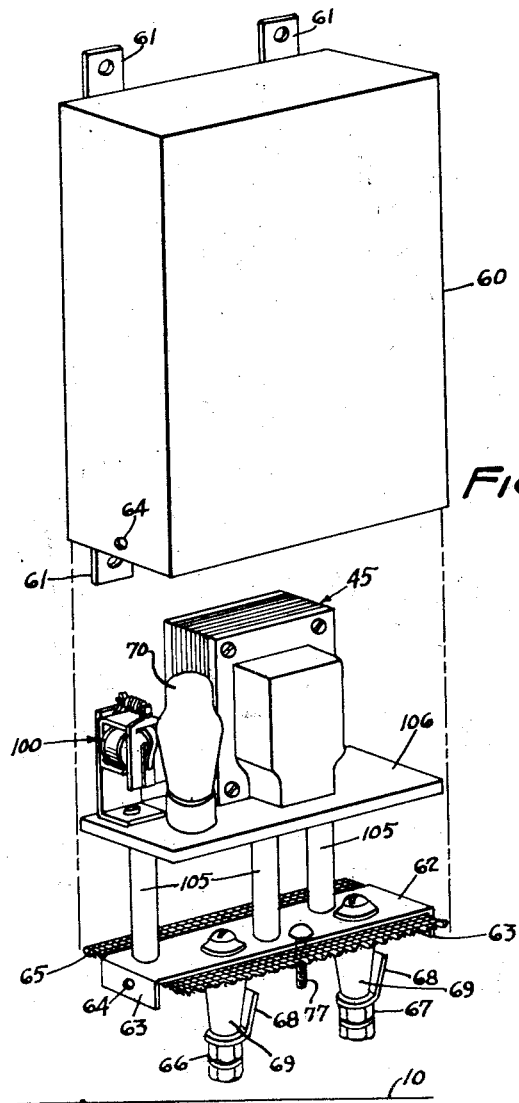
Figure 1:
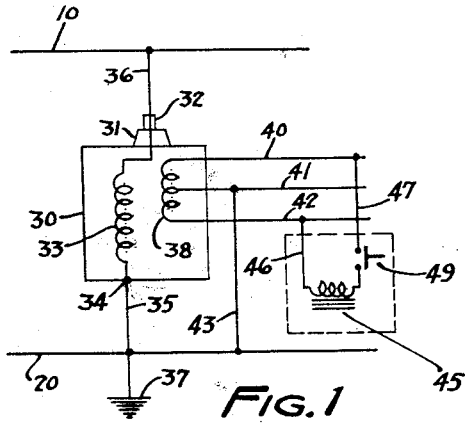
Figure 4:
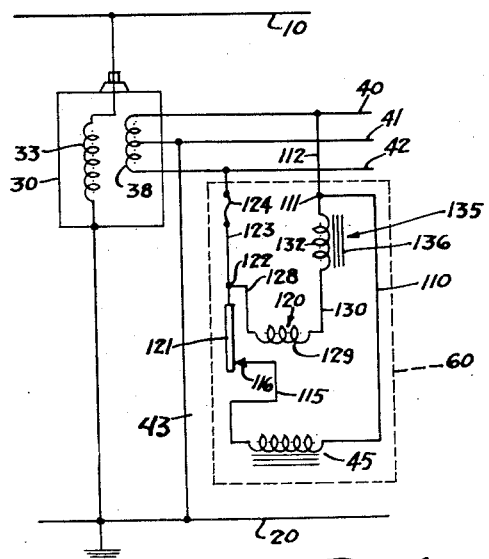
Figure 2:
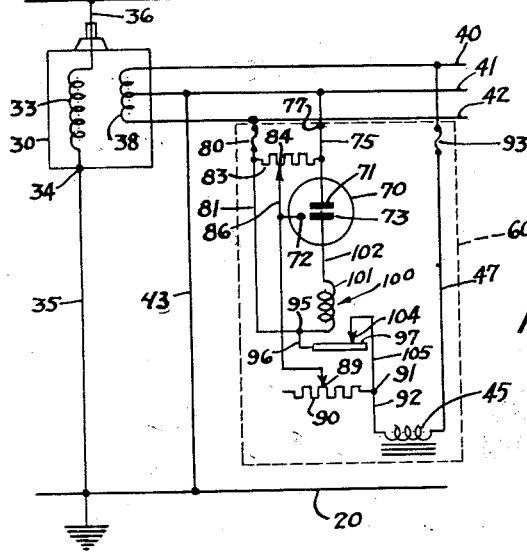

The invention is illustrated with reference to the drawing in which Figure 1 is a schematic wiring diagram of the voltage regulated distribution system and regulator apparatus of the present invention; Figure 2 is a wiring diagram of a section of a voltage regulator of a distribution system including one modification of the regulator apparatus of the present invention; Figure 3 is a separated perspective view of the actual embodiment of the regulating apparatus shown in Figure 2; and Figure 4 is a wiring diagram of a section of a voltage regulator distribution system of the present invention, including a second modification of the regulating apparatus.

Throughout the drawing corresponding numerals refer to the same parts.

Referring to Figure 1, there is illustrated a portion of a distribution system of the type now commonly used in rural electrifications wherein a single insulated conductor 10 and a single uninsulated ground conductor 20 constitutes the primary circuit. While the voltage of the primary circuit is not of importance in the invention in that inherently high capacitative characteristics are to be found in systems of various primary voltages, it may be stated that the typical rural and suburban system of the present time utilizes a primary voltage of 6900–7200 volts. In such distribution systems there are a number of distribution transformers connected to the primary conductors 10 and 20. In the typical rural electrification system the transformers comprise a steel tank 30 having a single insulator 31 and terminal 32, which is connected to the insulated high voltage primary distribution line 10. The terminal 32 is connected, within the transformers, to the primary winding 33 of the transformer, the opposite end of the winding being grounded to the tank 30 as indicated at ground connection 34. In order to complete the primary circuit, the case 34 is solidly connected by ground wire 35 to grounded conductor 20 which is usually uninsulated. In some systems the "ground wire" 20 is not used, each transformer being connected to earth, as indicated at 37. The secondary winding 38 of the transformer is customarily a 3-wire, 120–240 volt circuit, illustrated herein by conductors 40, 41 and 42. The potential across conductors 40 and 42 may be 240 volts, while the potential across conductors 40 and 41 and across conductors 41 and 42 in such instance would be 120 volts. It is customary to ground the "neutral" conductor 41 by a suitable ground connection as indicated at 43, or sometimes through a spark discharge gap.

The regulating apparatus consists of an iron-cored, low-voltage reactor 45, which is designed to be connected to the secondary distribution lines 40 and 42. The iron-core of the reactor is of such size that it does not introduce excessive harmonic magnetizing currents beyond those ordinarily experienced in the design of distribution transformers, or stated another way, the iron-core of reactance 45 is magnetized to a degree approximately the same as utilized in distribution transformers. The reactor 45 is connected to line 42 by conductor 46 and line 40 by means of conductor 47. In the circuit composed of conductor 46, the coil of reactor 45 and conductor 47 there is interposed a relay-operated switch schematically illustrated at 49 in Figure 1, the relay being of a type such that the switch 49 will be closed when the voltage across lines 40 and 42 exceeds a predetermined maximum. Thus in the illustrated embodiment, when the voltage across lines 40 and 42 rises to, say 5% above the desired 240 volts, relay 49 closes and automatically connects reactor 45 to the secondary feeders 40 and 42. The effect of this arrangement is to add to the distribution system of reactive load whenever the voltage at the system rises beyond a predetermined value. It is to be understood that the regulator apparatus composed of reactor 45 and automatic voltage responsive circuit closer 49 are mounted in suitable housing which may conveniently be mounted immediately adjacent the transformer or at the customer's meter. A number of regulator units are distributed throughout the system at intervals of 1 to 5 miles in the rural distribution systems, and at shorter intervals in urban systems. It is desirable to utilize a large number of small-size reactor units widely distributed rather than a small number of units of large size at a few places in the system, for the large number of small units gives better voltage regulation throughout the system and the regulation is achieved by small increments of voltage.

A desirable embodiment of the voltage regulator unit is illustrated in Figures 2 and 3. Referring to Figure 2, there is illustrated an insulated high voltage primary line 10 and ground conductor 20 connected to the primary winding 33 of the distribution transformer 30 by means of conductors 35 and 36 as illustrated in Figure 1. The secondary winding 38 of the transformer is connected to secondary distribution lines 40, 41 and 42, of which "neutral" line 41 is grounded by conductor 43. The voltage regulator unit is housed within a suitable housing 60 which will be described more completely hereinafter.

Within the regulator unit housing 60 there is located an iron-cored reactor 45 of the type described with respect to Figure 1, a voltage responsive relay, various resistors, a grid-glow tube, and circuit connections. In this instance, the voltage responsive apparatus comprises a grid-glow tube 70 having a cathode 71, a starting anode 72, and an operating anode 73. The cathode 71 is connected by line 75 to neutral conductor 41 of the secondary distribution circuit, and this conductor is grounded to the regulator housing as indicated at 77. Conductor 42 is connected to the regulator through a fuse 80 which terminates in line 81. Line 81 is connected to a resistor 83, the opposite terminal of which is connected to ground wire 75. From an adjustable or selected intermediate point 84 of resistor 83 there extends a line 86 which is connected to the starting anode 72 and to an adjustable or selected point 89 of resistor 90, the opposite circuit connection of resistor 90 being connected at point 91 to line 92 leading to one terminal of reactor 45. The opposite terminal of reactor 45 is connected by means of line 47 to conductor 40 of the secondary distribution circuit; and in line 47 there may be inserted, if desired, a suitable protective fuse 93.

Line 81 extends from its connection to resistor 83 to a junction 95 and thence through conductor 96 to an armature 97 of a relay, generally designated 100. One end of the operating coil 101 of the relay 100 is likewise connected to junction 95, and the other end of the coil 101 is connected through line 102 to the operating anode 73 of the grid-glow tube 70. The armature 97 is biased by means of a weight or spring so as normally to be out of contact with cooperating contact 104 of the relay, the contact 104 being connected by line 105 to junction 91 of resistor 90 and reactor 45.

A desirable physical embodiment of the regulator apparatus of Figure 2 is illustrated in Figure 3 wherein the housing 60 comprises preferably a sheet metal case having the sides and top closed and, if desired, an open bottom. The case is provided with suitable lugs 61 by means of which the unit may conveniently be mounted upon the pole carrying the transformer 30 or at any other convenient location. Within the case there is housed a unit consisting of a bottom plate 62 which is flanged over as shown at 63 so as to fit neatly between the side walls of housing 60 where it may be held in place by bolts inserted through apertures 64. Along each edge of the bottom plate 62 there is a strip of screen wire 65 which serves to fill out the width between the strip 62 and the front and back of housing 60. The screened bottom allows ventilation of the unit but at the same time prevents birds and insects from entering and thereby disorganizing the apparatus. If desired, a solid bottom 62 may be used and screens 65—65 are then omitted.

Upon the base plate 62 there are mounted insulated connection studs 66 and 67, each of which is provided with a spark gap plate 68 paralleling insulators 69 and extending to within a short distance of the plate 62. Plate 62 is provided with a ground terminal 77. The insulated studs 66 and 67 serve to receive the connection leads from lines 40 and 42 respectively, and thus excessive voltage upon these lines such as is due to lightning is discharged by spark from members 68 to plate 62, thence to ground through connection 77 to line 41. Upon the plate 62 there are mounted three pillars 105 which serve to support an intermediate horizontal partition 106, the space between the plate 62 and the partition 106 being provided for the wiring connections and for the mounting of resistors 83 and 90 and fuses 80 and 93. In Figure 3 these fuses 80 and 93, resistors 83 and 90, and wiring connections have been omitted for clarity. Upon plate 106 there are mounted the iron-cored reactor 45, the grid-glow tube 70, and relay 100, these elements, resistors 83 and 90, and fuses 80 and 93 being connected as shown in the wiring diagram of Figure 2. Thus, the reactor and its controls, together with suitable safety devices therefor, are all contained within a small, waterproof, ventilated unit capable of being mounted and installed by inexperienced help. The only requirements for installation are that the unit be properly supported and that three connections, viz., from terminals 66, 77 and 67, be made to lines 42, 41 and 40 respectively. A typical reactor unit of the type shown has over-all dimensions of 4" x 4½" x 8½", but these dimensions should not be considered as a limitation upon the invention, for they are cited merely as indicating the small convenient size of the apparatus.

As further specifically illustrating the invention, there may be given the following constants of a specific unit for a rural electrification line:

It is assumed that said line has the following constants: Wire size #2 A. C. S. R.; vertical spacing 4 ft.; resistance per mile per line, 2.38 ohms at 50° C.; reactance per mile of line at 4 ft. spacing, 1.66 ohms; shunt capacitative reactance per mile of line at 4 ft. spacing, $.169 \times 10^6$ ohms.

If it is assumed that regulators are placed at customers' transformers and that the average spacing is one unit per mile, a suitable relatively close regulation may be achieved by utilizing an iron-cored reactor having an inductive susceptance of $2.55 \times 10^{-3}$ mhos. per unit. In such a regulator, the resistor 83 is of the order and magnitude of 10,000 ohms, and resistor 90 is of the order of .2 to .5 megohm. The junction points 84 and 89 (see Figure 2) may be made so as to be adjustable. Alternatively solid connections may be made at junctions 84 and 87 after suitable factory adjustment. The operation of such a unit, which may be considered as of the type illustrated in Figures 2 and 3, is as follows:

It is assumed that the potential across lines 40 and 42 is 240 volts, and that a potential of 120 volts exists between secondary distribution lines 40 and 41 and between lines 41 and 42. It is also assumed that relay 100 is in the normal "open" condition with armature 97 out of engagement with contact 104. Under these conditions a circuit may be traced from distribution line 41 through conductor 75, resistor 83, line 81, fuse 80, to distribution line 42. A circuit may also be traced from distribution line 41, through conductor 75, through cathode 71 of the grid-glow tube 70, thence from operating anode 73, through line 102, relay operating coil 101, junction 95, line 81, and fuse 80, to distribution line 42. Under normal voltage conditions the grid-glow tube 70 is not conductive, and accordingly no current goes through the circuit last traced, and relay 101 remains unoperated, i.e., in the "open" condition. During such normal conditions, the potential existing between starting anode 72 and the cathode 71 of the grid-glow tube 70 is determined by the potential gradient across that portion of resistor 83 between lines 75 and 84. The tap 84 is initially adjusted so that the potential imposed upon the starting anode 72 is a few per cent below the striking or starting potential of the grid-glow tube 7. It will be noted that a circuit exists from distribution line 40 through fuse 93, line 47, and winding of reactor 45, and line 92, to junction 91, thence through resistor 90, to tap 89, and then through line 86, to tap 84, and through the portion of resistor 83, to the left of tap 84 in Figure 2, to line 81 and through fuse 80 to line 42. Resistor 90 is of very much higher resistance than resistor 83 and only a small current therefore flows through the reactor 45. This current flowing through resistor 90 is not significant until the grid-glow tube is in operation, as will later be explained.

It is assumed that the characteristics of the primary distribution lines 10–20 include relatively high capacitance and, therefore, when the wattage load on the line decreases, there may occur a significant rise in voltage due to the partial resonance effect of feeding the high capacitative primary circuit through the line inductance. When this occurs, there is corresponding increase of the potential across the secondary discharge feeders 40, 41 and 42 with the result that the potential difference between the starting anode 72 and the cathode 71 of the grid-glow tube reaches a point where it increases sufficiently to cause ionization within tube 70. Discharge through the tube 70 then occurs from the cathode 71 to the operating anode 73.

Current is, accordingly, permitted to flow through the winding 101 of relay 100 and armature 97 draws into contact with stationary contact 104, thus permitting current to flow from feeder 41 to line 75 through the cathode 71 of the grid-glow tube 70, thence to the operating anode 73, line 102, coil 101, to junction 95, and thence through line 96, armature 97, contact 104, and line 105, junction 91, and through line 92, to reactor 45, and finally through line 47 and fuse 93, to feeder 40. The continuance of current flow through the reactor circuit just traced is determined by the conductivity of tube 70. When the reactor 45 is thus connected to the secondary of transformer 30, the load thus applied compensates for the capacitative load and accordingly tends to decrease the voltage between the primary lines 10 and 20 at the transformer 30.

As there is comparatively small voltage difference between the ionization and de-ionization voltages of the grid-glow tube 70, the reduction in voltage which occurs when the reactor 45 is connected to the secondary distribution feeders may effect a de-ionization of the tube 70 as soon as the reactor 45 is effectively connected as a load. This would stop current flow through the tube and cause the relay to open and thus allow the line voltage to rise. This would lead to repeated operation of the tube 70 and relay 100, and "chattering." This difficulty is overcome by the action of resistor 90 which, it will be observed, is connected so as to shunt the section of the resistor 83 between line 81 and contact 84, when the relay armature 97 is in contact with the stationary contact 104. This may be observed by tracing the following circuit: beginning at relay contact 104 the circuit is through line 105, junction 91, through resistor 90, junction 89 and line 86, to junction 84, and thence through resistor 83 to line 81, junction 95, line 96, and armature 97 back to relay contact 104. Hence, resistor 90 is placed in parallel with that segment of resistor 83 between line 81 and junction 84, and serves slightly to increase the flow of current through the portion of resistor 83 between line 75 and junction 84. This, in turn, slightly increases the voltage drop between line 75 and junction 84, with the result that after the relay 100 has operated, the potential across secondary lines 40, 41 and 42 has been decreased, the portion of this secondary voltage controlling ionization of tube 70 is increased, with the net result that the tube 70 continues in an ionized and conductive condition. Chattering of relay 100 is thus prevented. Stated another way, the potential at which the reactor 45 is effectively disconnected from the secondary distribution circuit is slightly lower than the potential at which it was connected to the secondary distribution circuit. The same result may be accomplished when using other gaseous or electronic tube methods of control by use of suitable circuit connections.

As the relatively high capacitance distribution system is assumed to be provided with regulators at intervals of from 1 to 5 miles throughout the system, it is possible to achieve voltage regulation to within two to three per cent by small increments since the operation of any one regulator represents but a very small percentage added inductive load as compared with the total inductive loads represented by all regulator units connected to the system. The use of a relatively large number of regulators at spaced intervals through the system likewise provides a comparatively uniform voltage throughout the system by providing regulation exactly where needed and when needed.

In Figure 4 there is illustrated another modification of the invention which is particularly adapted for use where a low-cost regulator is desired and somewhat greater voltage variation is permissible. In Figure 4 the transformer 30 has a primary 33 connected to insulated high voltage primary line 10 and grounded line 20 in a manner exactly similar to that described and illustrated with reference to Figures 1 and 2. The secondary windings 38 of the transformer are connected to secondary feeders 40, 41 and 42. The regulator apparatus is contained within a suitable casing 60, and comprises an iron-cored reactor 45 which is designed to operate on the potential existing across secondary feeders 40 and 42. Reactor 45 is permanently connected by means of line 110 through junction 111 and line 112 to secondary feeder 40. The opposite end of the reactor is connected by means of line 115 to contact 116 of the relay generally designated 120. Contact 116 is arranged to be engaged by a movable armature 121 which is weight or spring biased so as normally to be out of engagement with contact 116. The armature 121 is connected at junction 122 to line 123, which is provided with a fuse 124 and is connected to secondary feeder 42. From junction 122 a circuit extends through line 128 through the coil 129 of the relay 120 and thence through line 130 through the winding 132 of a control reactor generally designated 135 and thence to junction 111 through line 112 to secondary feeder 40. It will thus be observed that a circuit extends from feeder 40 through line 112 to junction 111 thence through winding 132 of reactor 135, line 130, coil 129 of relay 120, and line 128 to junction 122, thence through line 123, to feeder 42, and current flows continuously through this circuit in an amount determined by the reactance of reactor 135.

The iron-core 136 of control reactor 135 is of such a size that when a predetermined normal potential exists in lines 40 and 42, the iron-core 136 operates just slightly below magnetic saturation, and thus draws what may be termed a normal magnetizing current. The bias of armature 121 is adjusted so that when such normal magnetizing current is flowing through control reactor 135 and coil 129 of relay 120, the armature 121 will not be pulled into engagement with contact 116. However, when the potential across feeders 40 and 42 increases, a disproportionate increase of magnetizing current will occur through the coil 132 of control reactor 135, due to the fact that the magnetic core 136 even under normal conditions is operating at or just slightly below saturation. Thus, any increase in applied voltage and consequent increase in magnetic flux in the iron-core 136 requires a disproportionately large increase in the magnetizing current and as this current is drawn through coil 129 of relay 120, this increase is sufficient to cause movement of the armature 121 into contact with relay 116. A circuit is thus closed from secondary distribution feeder 40 through line 112, through junction 111, through line 110, and through the coil of reactor 45, line 115, contact 116, armature 121, line 123, fuse 124, to secondary distribution feeder 42; and reactor 45 is accordingly connected as a load upon the distribution system.

The consequent decrease in voltage due to the connection of reactor 45 may cause the voltage across lines 40 and 42 to decrease below the value which initiated the action of relay 120, but since the drop-out current of relay 120 is less than its pull-in current, the relay 120 remains operated and the reactor 45 accordingly remains connected to the distribution circuit until the voltage across the secondary distribution feeders 40 and 42 has decreased an additional amount determined by the characteristics of the relay 120. The relay 120 may be designed or adjusted so as to provide any reasonable range of voltages between the pull-in and drop-out voltages. In this manner regulation is achieved by the inherent operation of relay 120 in conjunction with reactor 135, and chattering is inherently avoided.

Many obvious variations will occur to those skilled in the art; thus the relays 100 and 120, together with their controls, may be widely varied so long as they are capable of being operated at a predetermined voltage potential and remains operated until the potential has decreased below the operation-initiating potential.

Other variations will occur to those skilled in the art, and are deemed to be within the purview of the invention claimed, as follows.

I claim:

1. An article of manufacture, a voltage regulator unit capable of being mounted on a pole line pole, comprising a unit casing, insulated terminals on the casing, an iron-cored reactor and a circuit controller mounted within the casing, and means within the casing operative when the voltage impressed upon the terminals exceeds a predetermined value for effectively connecting the reactor to said terminals, said means being effective to maintain said reactor effectively connected until the voltage has decreased to a predetermined lower level.

2. An article of manufacture, a voltage regulator unit comprising a unit casing of a size for convenient mounting on a pole line pole, a ground terminal and insulated first and second line terminals through said casing, an iron-cored reactor coil connected in series with a high resistance and to said first and second line terminals, and means including a voltage responsive thermionic tube and connected electromagnetic circuit controller means for shunting said resistance effectively to connect the reactor across the line terminals when the voltage impress across said terminals exceeds a predetermined maximum.

3. The apparatus of claim 1 further characterized in that said insulated terminals include spark gap portions positioned in spaced relation with respect to the grounded casing.

4. The apparatus of claim 1 further characterized in that said casing has closed sides and top and an open bottom and the said reactor coil, and means for connecting the reactor are mounted upon a removable base plate of said casing.

5. An article of manufacture, a voltage regulator unit adapted for outside mounting alongside the customer transformer in a rural electrification system comprising a casing suitable for pole line installation, an iron-cored, low-voltage reactor relay having an operating coil and contacts and a thermionic tube all mounted within the casing, said thermionic tube being connected through said relay winding to a pair of low voltage terminals, said relay when operated at a predetermined voltage being connected to establish a circuit through said low voltage reactor.

6. The apparatus of claim 5 further characterized in that said iron-cored reactor is air-cooled.

MORRIS NEWMAN.